(12) United States Patent
Yamada

(10) Patent No.: US 10,432,271 B2
(45) Date of Patent: Oct. 1, 2019

(54) RADIO APPARATUS, RADIO COMMUNICATION SYSTEM, AND ANTENNA POSITION ADJUSTMENT METHOD

(71) Applicant: NEC CORPORATION, Tokyo (JP)

(72) Inventor: Shigeo Yamada, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/068,017

(22) PCT Filed: Dec. 9, 2016

(86) PCT No.: PCT/JP2016/086656
§ 371 (c)(1),
(2) Date: Jul. 3, 2018

(87) PCT Pub. No.: WO2017/119233
PCT Pub. Date: Jul. 13, 2017

(65) Prior Publication Data
US 2019/0028154 A1 Jan. 24, 2019

(30) Foreign Application Priority Data
Jan. 4, 2016 (JP) .................................. 2016-000200

(51) Int. Cl.
*H04B 7/0413* (2017.01)
*H04B 7/06* (2006.01)
(Continued)

(52) U.S. Cl.
CPC .......... *H04B 7/0413* (2013.01); *H01Q 1/125* (2013.01); *H04B 7/06* (2013.01); *H04B 7/08* (2013.01);
(Continued)

(58) Field of Classification Search
CPC ... H04B 7/0413; H04B 7/0408; H01Q 21/245
(Continued)

(56) References Cited

U.S. PATENT DOCUMENTS

2010/0290552 A1* 11/2010 Sasaki ................. H04B 7/0413
375/267
2013/0178181 A1* 7/2013 Pohlabeln ............... H01Q 1/242
455/226.1
(Continued)

FOREIGN PATENT DOCUMENTS

JP 2013-055604 A 3/2013
JP 2014-027347 A 2/2014
(Continued)

OTHER PUBLICATIONS

Extended European Search Report dated Nov. 28, 2018 issued by the European Patent Office in counterpart application No. 16883733.4.
International Search Report for PCT/JP2016/086656, dated Feb. 28, 2017.

*Primary Examiner* — Kevin Kim
(74) *Attorney, Agent, or Firm* — Sughrue Mion, PLLC

(57) ABSTRACT

A radio apparatus (10) according to the present invention used in a line-of-sight (LOS) MIMO communication system includes a plurality of antennas (15, 16) and a position adjustment unit (12). The position adjustment unit (12) is configured to be able to adjust a relative position between at least one of the plurality of antennas (15, 16) and an antenna included in another radio apparatus (other station). According to the present invention, it is possible to provide a radio apparatus capable of adjusting antennas to appropriate positions in the line-of-sight MIMO communication system.

12 Claims, 13 Drawing Sheets

(51) Int. Cl.
*H04B 7/08* (2006.01)
*H01Q 1/12* (2006.01)
*H04L 5/14* (2006.01)
*H01Q 21/28* (2006.01)

(52) U.S. Cl.
CPC ............ *H04L 5/14* (2013.01); *H01Q 1/1228* (2013.01); *H01Q 21/28* (2013.01)

(58) Field of Classification Search
USPC .................................................. 375/267, 299
See application file for complete search history.

(56) References Cited

U.S. PATENT DOCUMENTS

| | | | |
|---|---|---|---|
| 2014/0169430 A1* | 6/2014 | Nilsson .................. | H04B 7/043 375/227 |
| 2015/0195016 A1* | 7/2015 | Kim ...................... | H04B 7/0413 455/63.4 |
| 2016/0380681 A1* | 12/2016 | Sahota .................. | H04B 7/0413 375/267 |
| 2018/0351606 A1* | 12/2018 | Uchida .................. | H04B 7/046 |

FOREIGN PATENT DOCUMENTS

| | | |
|---|---|---|
| JP | 2014-239391 A | 12/2014 |
| WO | 2009/017230 A1 | 2/2009 |
| WO | 2014/192845 A1 | 12/2014 |

\* cited by examiner

RADIO APPARATUS, RADIO COMMUNICATION SYSTEM, AND ANTENNA POSITION ADJUSTMENT METHOD

CROSS REFERENCE TO RELATED APPLICATIONS

This application is a National Stage of International Application No. PCT/JP2016/086656 filed Dec. 9, 2016, claiming priority based on Japanese Patent Application No. 2016-000200 filed Jan. 4, 2016, the disclosure of which is incorporated herein in its entirety by reference.

TECHNICAL FIELD

The present invention relates to a radio apparatus, a radio communication system, and an antenna position adjustment method, and especially, to a radio apparatus, a radio communication system, and an antenna position adjustment method used for a MIMO communication system.

BACKGROUND ART

A MIMO (Multi-Input Multi-Output) communication system has been in practical use as a technique for increasing a transmission capacity of a radio apparatus. This technique is a technique which can increase a transmission capacity by providing a plurality of antennas on each of a transmitting side and a receiving side of a radio communication system. This MIMO communication system can be divided into two communication methods which are None Line of Sight (NLOS) communication and Line of Sight (LOS) communication.

NLOS communication is communication which is performed between radio apparatuses in a state where they cannot be directly observed by each other, and radio waves transmitted from a radio apparatus on a transmitting side are received by a radio apparatus on a receiving side mostly after being reflected, being diffracted, or passing some object. A plurality of transmission paths are necessary in order to increase a transmission capacity in the MIMO communication system. Therefore, the MIMO communication system is compatible with the NLOS communication which can secure a plurality of transmission paths by having transmitted radio waves reflected and/or diffracted. The NLOS communication has been adopted to and in practical use in various standards for mobile phones and wireless LANs, etc.

LOS communication is communication which is performed between radio apparatuses in a state where they can be directly observed by each other, and radio waves received by a radio apparatus on a receiving side are mainly direct waves. Patent Literature 1 discloses a technique related to a MIMO communication system used for LOS communication.

CITATION LIST

Patent Literature

Patent Literature 1: International Patent Publication No. WO 2009/017230

SUMMARY OF INVENTION

Technical Problem

As explained in the background art, a plurality of transmission paths are necessary in order to increase a transmission capacity in the MIMO communication system. However, there is a problem that it is difficult to secure a plurality of transmission paths in the LOS communication in which direct waves are dominant. Therefore, it is necessary to appropriately adjust antenna positions in order to secure a plurality of transmission paths in the MIMO communication system using the LOS communication.

In view of the above-described problem, an object of the present invention is to provide a radio apparatus, a radio communication system and an antenna position adjustment method capable of adjusting antennas to appropriate positions in a line-of-sight MIMO communication system.

Solution to Problem

A radio apparatus according to the present invention is a radio apparatus used in a line-of-sight MIMO communication system, including: a plurality of antennas; and a position adjustment unit configured to adjust a relative position between at least one of the plurality of antennas and an antenna included in another radio apparatus.

A radio communication system according to the present invention is a radio communication system configured to perform line-of-sight MIMO communication, including first and second radio apparatuses. The first radio apparatus includes: a plurality of antennas; and a first position adjustment unit configured to adjust a relative position between at least one of the plurality of antennas and an antenna included in the second radio apparatus.

An antenna position adjustment method according to the present invention is an antenna position adjustment method for a radio apparatus used in a line-of-sight MIMO communication system.

The radio apparatus includes first and second antennas configured to receive a radio wave transmitted from another radio apparatus, and the radio apparatus adjusts a position of the second antenna so that a phase of the radio wave transmitted from the another radio apparatus and received through the second antenna is shifted from a phase of the radio wave transmitted from the another radio apparatus and received through the first antenna by $\pi/2$.

Advantageous Effects of Invention

According to the present invention, it is possible to provide a radio apparatus, a radio communication system and an antenna position adjustment method capable of adjusting antennas to appropriate positions in a line-of-sight MIMO communication system.

DESCRIPTION OF EMBODIMENTS

First Embodiment

Figure 1:
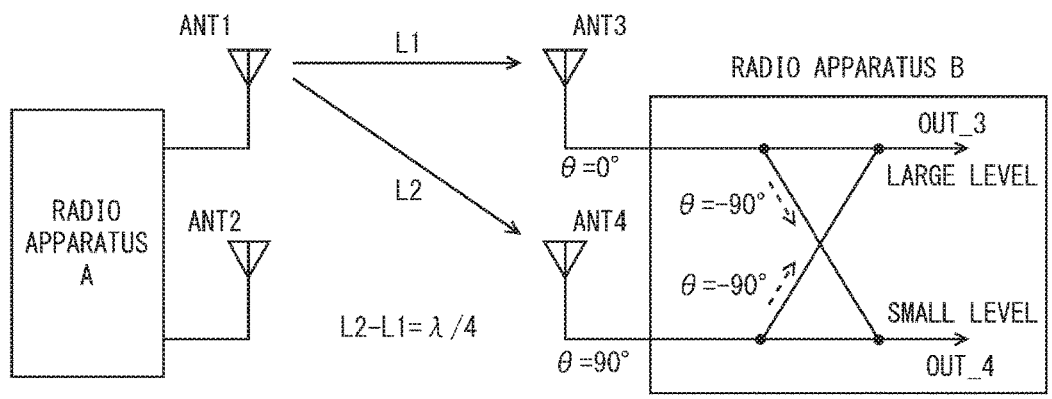
FIG. 1 is a diagram for explaining a LOS-MIMO communication system.

Embodiments of the present invention are explained hereinafter with reference to the drawings. First, a line-of-sight MIMO communication system (LOS-MIMO communication system) will be described with reference to FIG. 1 and FIG. 2. FIG. 1 shows a state where a radio wave transmitted from an antenna ANT1 of a radio apparatus A is received through antennas ANT3 and ANT4 of a radio apparatus B. Positions of the antennas ANT3 and ANT4 of the radio apparatus B are arranged so that phases of the radio wave transmitted from the antenna ANT1 are shifted from each other by 90°. Specifically, the antennas ANT3 and ANT4 are arranged so that when a phase $\theta$ of the radio wave received through the antenna ANT3 is set to 0°, a phase $\theta$ of the radio wave received through the antenna ANT4 becomes 90°. For example, when a distance between the antennas ANT1 and ANT3 is represented by L1 and a distance between the antennas ANT1 and ANT4 is represented by L2, the antennas ANT3 and ANT4 are arranged so that a path difference is expressed as L2−L1=$\lambda$/4 ($\lambda$ is wavelength).

Then, when the reception signal received through the antenna ANT3 (phase $\theta$=0°) and a signal obtained by shifting a phase of the reception signal received through the antenna ANT4 ($\theta$=90°) by −90° (phase $\theta$=90°−90°=0°) are combined with each other, the signals are mutually strengthened in an output path OUT_3 and a signal having a large level is output therefrom. In contrast to this, when the reception signal received through the antenna ANT4 (phase $\theta$=90°) and a signal obtained by shifting a phase of the reception signal received through the antenna ANT3 ($\theta$=0°) by −90° (phase $\theta$=0°−90°=)−90° are combined with each other, the signals are mutually weakened in an output path OUT_4 and a signal having a small level is output therefrom.

Figure 2:
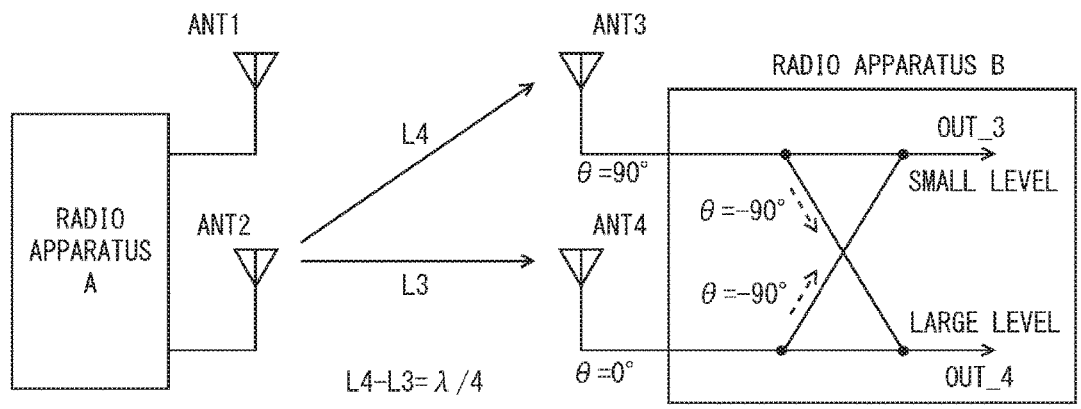
FIG. 2 is a diagram for explaining a LOS-MIMO communication system.

FIG. 2 shows a state where a radio wave transmitted from an antenna ANT2 of a radio apparatus A is received through antennas ANT3 and ANT4 of a radio apparatus B. Positions of the antennas ANT3 and ANT4 of the radio apparatus B are arranged so that phases of the radio wave transmitted from the antenna ANT2 are shifted from each other by 90°. Specifically, the antennas ANT3 and ANT4 are arranged so that when a phase $\theta$ of the radio wave received through the antenna ANT3 is set to 90°, a phase $\theta$ of the radio wave received through the antenna ANT4 becomes 0°. For example, when a distance between the antennas ANT2 and ANT4 is represented by L3 and a distance between the antennas ANT2 and ANT3 is represented by L4, the antennas ANT3 and ANT4 are arranged so that a path difference is expressed as L4−L3=$\lambda$/4 ($\lambda$ is wavelength). Note that in this embodiment, the antennas ANT1 to ANT4 are arranged so that the positions of the antennas ANT3 and ANT4 of the radio apparatus B shown in FIG. 1 satisfy the condition of L2−L1=$\lambda$/4 and the positions of the antennas ANT3 and ANT4 of the radio apparatus B shown in FIG. 2 satisfy the condition of L4−L3=$\lambda$/4.

Then, when the reception signal received through the antenna ANT3 (phase $\theta$=90°) and a signal obtained by shifting a phase of the reception signal received through the antenna ANT4 ($\theta$=0°) by −90° (phase $\theta$=0°−90°=)−90° are combined with each other, the signals are mutually weakened in the output path OUT_3 and a signal having a small level is output therefrom. In contrast to this, when the reception signal received through the antenna ANT4 (phase $\theta$=0°) and a signal obtained by shifting a phase of the reception signal received through the antenna ANT3 ($\theta$=90°) by −90° (phase $\theta$=90°−90°=0°) are combined with each other, the signals are mutually strengthened in the output path OUT_4 and a signal having a large level is output therefrom.

By the above described operation, the radio wave (signal) transmitted from the antenna ANT1 and the radio wave (signal) transmitted from the antenna ANT2 can be separated from each other in the radio apparatus B. Specifically, the radio wave (signal) transmitted from the antenna ANT1 is output from the output path OUT_3 of the radio apparatus B and the radio wave (signal) transmitted from the antenna ANT2 is output from the output path OUT_4 of the radio apparatus B. Thus, even in the case of a Line of Sight (LOS) communication, a MIMO communication system can be configured. Note that the above-described matters also apply to when a radio wave is transmitted from the radio apparatus B to the radio apparatus A.

As described above, the positions of respective antennas are important when a MIMO communication system is configured in a LOS communication. In other words, as shown in FIGS. 1 and 2, the antennas ANT3 and ANT4 need to be arranged so that phases of the radio waves received through respective antennas ANT3 and ANT4 of the radio apparatus B are shifted from each other by 90°.

Figure 3:
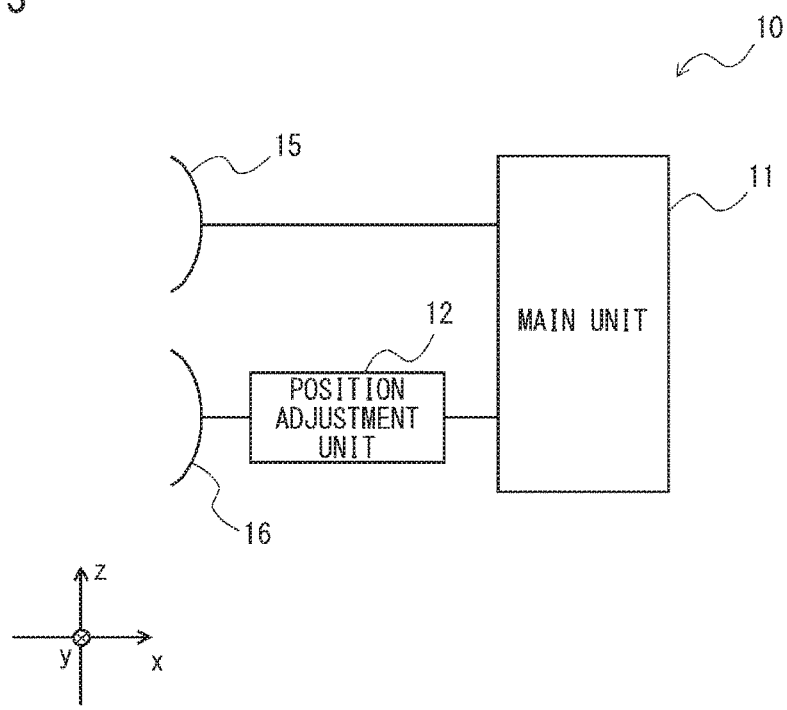
FIG. 3 is a diagram showing an example of a radio apparatus according to a first embodiment.

FIG. 3 is a diagram for explaining a radio apparatus according to this embodiment. As shown FIG. 3, a radio apparatus 10 according to this embodiment includes a main unit 11, a position adjustment unit 12 and a plurality of antennas 15 and 16. The main unit 11 includes a circuit for transmitting and receiving radio waves using the antennas 15 and 16. Note that a configuration example of the main unit 11 will be described in detail in the second embodiment.

The position adjustment unit 12 is configured so as to be able to adjust the position of the antenna 16. In other words, the position adjustment unit 12 is configured so that it can adjust a relative position between the antenna 16 included in the radio apparatus 10 (one's own station) and an antenna included in another radio apparatus (other station). Note that the radio apparatus 10 (one's own station) and the other radio apparatus (other station) are arrange d so that they can perform LOS-MIMO communication therebetween.

For example, the position adjustment unit 12 can adjust at least one of a position in an x-axis direction of the antenna 16, a position in a y-axis direction of the antenna 16, and a position in a z-axis direction of the antenna 16. An example in which the radio apparatus 10 shown in FIG. 3 is applied to the LOS-MIMO communication system shown in FIG. 1 is described hereinafter. In this case, the radio apparatus B shown in FIG. 1 corresponds to the radio apparatus 10 shown in FIG. 3, and the antennas ANT3 and ANT4 of the radio apparatus B shown in FIG. 1 correspond to the antennas 15 and 16 of the radio apparatus 10, respectively, shown in FIG. 3.

Figure 4:
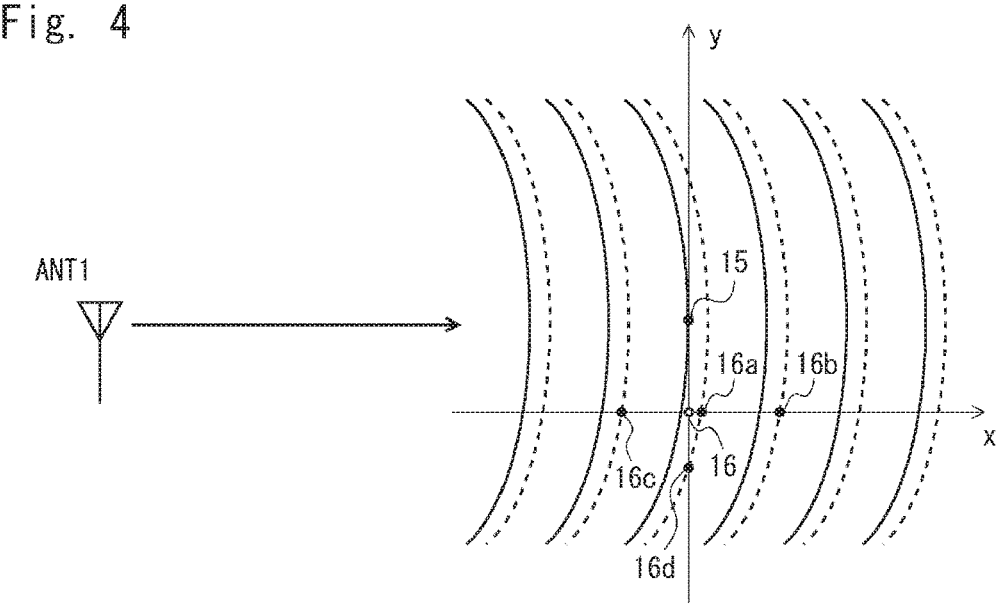
FIG. 4 is a diagram for explaining an antenna position of a radio apparatus according to a first embodiment.

FIG. 4 is a diagram for explaining an antenna position. Arcs (solid lines or broken lines) shown in FIG. 4 represent radio waves transmitted from the antenna ANT1, and radio waves indicated by solid lines have the same phases as each other and those indicated by broken lines have the same phases as each other. Further, broken lines indicate positions at which phases are delayed from phases ($\theta=0$) indicated by solid lines by $\eta/2$ (radian (the same applies to the rest of the descriptions)). For example, when the antennas 15 and 16 of the radio apparatus 10 are mounted, a phase in the antenna 15 is first set to 0 (solid line). The position of the antenna 16 at this point is, for example, the same as the position of the antenna 16 shown in FIG. 4.

Then, the position adjustment unit 12 displaces the antenna 16 along an x-axis (an axis which is roughly parallel to a straight line connecting the radio apparatus 10 and the other station. In other words, a depth direction with respect to the antenna ANT1 of the other station), and the displaced position is a position 16a on the broken lines. In this manner, the antenna 16 can be positioned so that a phase of the radio wave received through the antenna 15 and a phase of the radio wave received through the antenna 16 are shifted from each other by $\pi/2$.

Note that in this embodiment, the position of the antenna 16 may be any position where the phase of the radio wave received through the antenna 15 and the phase of the radio wave received through the antenna 16 are shifted from each other by $\pi/2$ (in other words, position indicated by broken lines). For example, as shown in FIG. 4, the position of the antenna 16 may be a position 16b which is one wavelength farther from the antenna ANT1 compared to the position 16a. Further, the position of the antenna 16 may be a position 16c which is one wavelength closer to the antenna ANT1 compared to the position 16a. Each of the positions 16a, 16b and 16c is a position located along the x-axis, respectively. Note that when a movable range of the antenna 16 is about one wavelength, there is only one place (position 16a in this case) where the antenna 16 is positioned in an optimal position (position where a phase is shifted by $\pi/2$). In contrast to this, when the movable range of the antenna 16 is about n wavelengths (n is an integer equal to or larger than 2), the number of optimal positions of the antenna 16 is n.

Further, in this embodiment, the antenna 16 may be displaced along a y-axis. In this case, the antenna 16 may be displaced along the y-axis and its position may be a position 16d (position indicated by broken lines). Further, in FIG. 4, while the case in which the antenna 16 is displaced in directions along the x- and y-axes is described above, the antenna 16 may be displaced along a z-axis (see FIG. 3). Furthermore, the antenna 16 may be displaced in an oblique direction with respect to each axis (i.e., any direction on an xy plane, any direction on a yz plan or any direction on an xz plane).

For example, the position adjustment unit 12 may adjust the position of the antenna 16 as follows. As shown in FIG. 1, a first reception signal is generated by combining a signal which is received through the antenna ANT4 and whose phase is shifted by $-90°$ ($-\pi/2$) and a signal which is received through the antenna ANT3 with each other. This first reception signal is output to the output path OUT_3 (hereinafter, also referred to as the first reception signal OUT_3). Further, a second reception signal is generated by combining a signal which is received through the antenna ANT3 and whose phase is shifted by $-90°$ ($-\pi/2$) and a signal which is received through the antenna ANT4 with each other. This second reception signal is output to the output path OUT_4 (hereinafter, also referred to as the second reception signal OUT_4).

Then, the position adjustment unit 12 adjusts the position of the antenna 16 (ANT4) based on at least one of the first reception signal OUT_3 and the second reception signal OUT_4. For example, the position adjustment unit 12 adjusts the position of the antenna 16 (ANT4) so that the signal level of the first reception signal OUT_3 is maximized and the signal level of the second reception signal OUT_4 is minimized (see FIG. 1). Alternatively, the position adjustment unit 12 adjusts the position of the antenna 16 (ANT4) so that the signal level of the first reception signal OUT_3 is minimized and the signal level of the second reception signal OUT_4 is maximized (see FIG. 2).

In other words, as described above, when the positions of the antenna 15 (ANT3) and the antenna 16 (ANT4) are positions where the phase of the radio waves received through the antenna 15 (ANT3) and the phase of the radio waves received through the antenna 16 (ANT4) are shifted from each other by $\pi/2$, the signal levels of the first and second reception signals OUT_3 and OUT_4 are maximized or minimized (see FIGS. 1 and 2). Thus, by utilizing this feature, the position adjustment unit 12 can adjust the position of the antenna 16 (ANT4) to an appropriate position.

Figure 5:
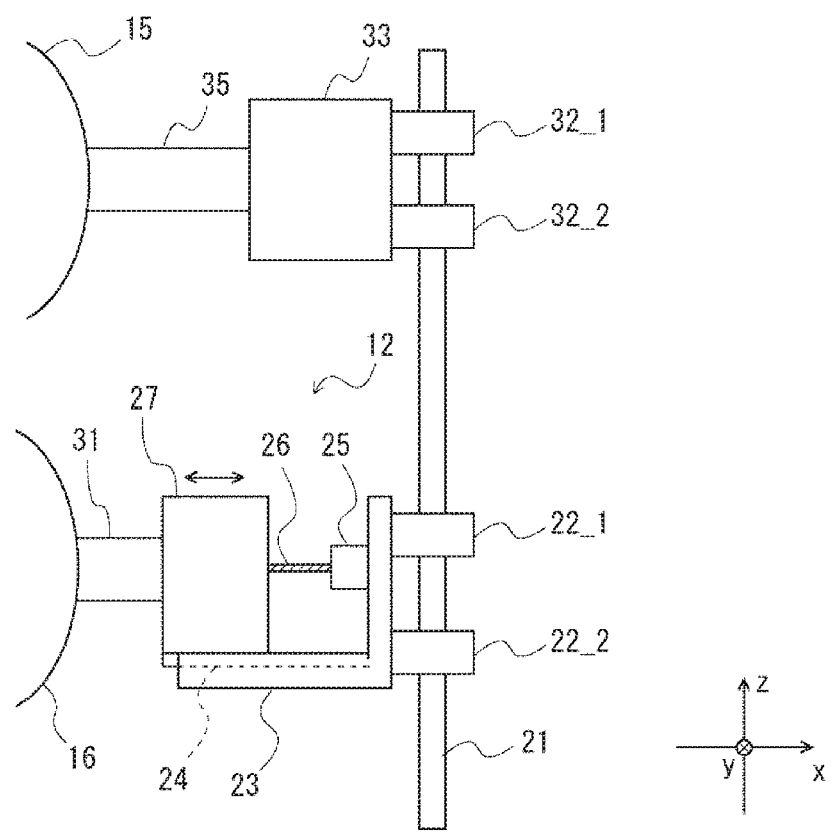
FIG. 5 is a side view showing an example of an antenna included in a radio apparatus according to a first embodiment.
Figure 6:
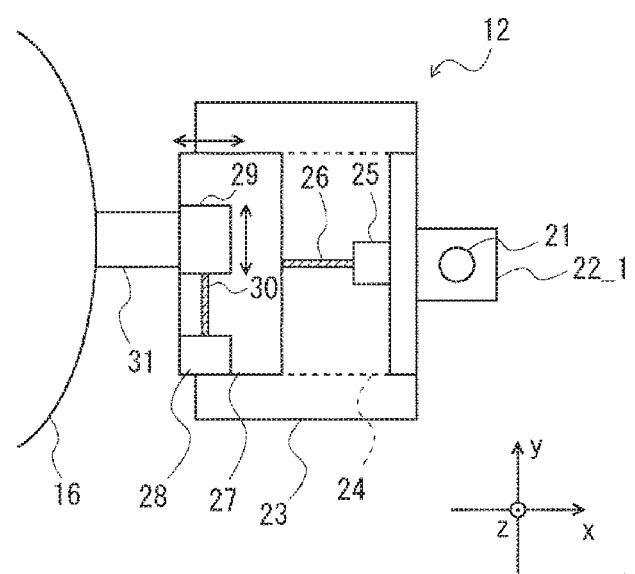
FIG. 6 is a top view showing an example of an antenna included in a radio apparatus according to a first embodiment.

Next, a configuration example of the antennas 15 and 16 included in the radio apparatus 10 according to this embodiment will be described. FIGS. 5 and 6 are a side view and a top view, respectively, showing an example of the antennas 15 and 16 included in the radio apparatus 10 according to this embodiment. Note that, in FIG. 6, the top views of the antenna 16 and the position adjustment unit 12 are shown while illustration of the antenna 15 is omitted.

As shown in FIG. 5, the antenna 15 is mounted on a fixing member 33 using a supporting member 35. The fixing member 33 is fixed to a pole 21 using clamps 32_1 and 32_2. The pole 21 is disposed so as to extend in the z-axis direction. For example, the z-axis direction is a vertical direction.

Further, as shown in FIGS. 5 and 6, a holder 23 is fixed to the pole 21 using clamps 22_1 and 22_2. A recess 24 is formed in the holder 23. A slider 27 is mounted so as to be able to move along the recess 24 of the holder 23 (i.e., along the x-axis). Further, a motor 25 is mounted on the holder 23. The motor 25 and the slider 27 are connected through a screw 26. The screw 26 has a threaded shape. By having the motor 25 rotate the screw 26, the slider 27 can be displaced along the x-axis. For example, the motor 25 is a stepping motor. By controlling a rotation direction and a rotation amount of the motor 25 using a control apparatus (not shown), the slider 27 can be displaced a predetermined amount along the x-axil.

Further, as shown in FIG. 6, a motor 28 is mounted on the slider 27. The motor 28 and a fixing member 29 are connected through a screw 30. The screw 30 has a threaded shape. By having the motor 28 rotate the screw 30, the fixing member 29 can be displaced along the y-axis. The antenna 16 is mounted on the fixing member 29 using a supporting member 31. For example, the motor 28 is a stepping motor. By controlling a rotation direction and a rotation amount of the motor 28 using a control apparatus (not shown), the fixing member 29 can be displaced a predetermined amount along the y-axis.

Note that in FIGS. 5 and 6, while the configuration in which the antenna 16 is able to be displaced along the x- and y-axes is described, the antenna 16 may be configured to be displaced only along the x-axis, or the antenna 16 may be configured to be displaced only along the y-axis in this embodiment. When the antenna 16 is configured to be displaced only along the x-axis, the motor 28 and the screw 30 can be omitted. Further, when the antenna 16 is configured to be displaced only along the y-axis, the motor 25 and the screw 26 can be omitted. Note that when the antenna 16 is configured to be able to move only along the z-axis, the motor and the screw can be used in the same manner as described above.

As described in the "Technical Problem", a plurality of transmission paths are necessary in order to increase a transmission capacity in the MIMO communication system. However, there has been a problem that it is difficult to secure a plurality of transmission paths in the LOS communication in which direct waves are dominant (LOS-MIMO communication system). Therefore, it has been necessary to appropriately adjust antenna positions in order to secure a plurality of transmission paths in the LOS-MIMO communication system.

Thus, as shown in FIG. 3, the radio apparatus 10 according to this embodiment is provided with the position adjustment unit 12 for the antenna 16. By being provided with the position adjustment unit 12 as described above, a relative position between the antenna 16 included in the radio apparatus 10 (one's own station) and an antenna included in another radio apparatus (other station) can be adjusted. Therefore, the antenna 16 can be positioned in an appropriate position, in other words, the position where the one's own station can perform LOS-MIMO communication with the other station. Specifically, the position adjustment unit 12 can adjust the position of the antenna 16 so that a phase of a radio wave received through the antenna 15 is shifted from a phase of a radio wave received through the antenna 16 by $\pi/2$.

Note that the position where the phase of the radio wave received through the antenna 15 and the phase of the radio wave received through the antenna 16 are shifted from each other by $\pi/2$ means a position where the phase of the radio wave received through the antenna 16 is shifted from the phase of the radio wave received through the antenna 15 by $\pm\pi/2$. The case where the phase of the radio wave received through the antenna 16 is shifted from the phase of the radio wave received through the antenna 15 by $+\pi/2$ means that the phase of the radio wave received through the antenna 16 is delayed from the phase of the radio wave received through the antenna 15 by $\pi/2$ (see FIG. 4). Further, the phase of the radio wave received through the antenna 16 being shifted from the phase of the radio wave received through the antenna 15 by $-\pi/2$ means that the phase of the radio wave received through the antenna 16 leads the phase of the radio wave received through the antenna 15 by $\pi/2$.

Note that while the case in which the position adjustment unit 12 is provided only for the antenna 16 is described above, the position adjustment unit may also be provided for the antenna 15 in the radio apparatus according to this embodiment. In other words, the position adjustment unit 12 may be provided for at least one of a plurality of antennas 15 and 16. For example, when the position adjustment unit is provided for two antennas 15 and 16, the positions of both of two antennas 15 and 16 can be adjusted. Therefore, the positions of the antennas 15 and 16 can be adjusted to more appropriate positions.

Further, while the case in which the radio apparatus 10 includes two antennas is described above, the radio apparatus 10 may include three or more antennas in this embodiment. In this case, the position adjustment unit 12 may also be provided for at least one of more than three antennas. More preferably, the number of position adjustment units provided in the radio apparatus 10 may be "equal to or greater than the number of the antennas−1". In other words, when the number of antennas of the radio apparatus 10 is three, the number of position adjustment units is preferably two or three.

Further, in the radio apparatus 10 according to this embodiment, the position adjustment unit 12 may be configured to be able to adjust the direction of the antenna 16 (e.g., an elevation angle or a horizontal angle) with respect to the other station so that the reception strength of radio waves transmitted from the ANT1 (see FIG. 4) of the other station is increased. For example, by providing a rotation mechanism in the fixing member 29 shown in FIG. 6, the antenna 16 can be rotated. Thus, the direction of the antenna 16 with respect to the other station can be adjusted.

Further, the invention according to this embodiment can be applied to any kind of radio apparatuses which can perform LOS-MIMO communication. For example, the invention can be applied to a radio communication system which is disposed in a place where it is able to perform a P2P (Peer To Peer) communication between the one's own station and the other station. Further, the antenna used for the radio apparatus may be antennas having a directivity.

The above described invention according to this embodiment can provide a radio apparatus, a radio communication system and an antenna position adjustment method capable of adjusting antennas to appropriate positions in a line-of-sight MIMO communication system.

Second Embodiment

Figure 7:
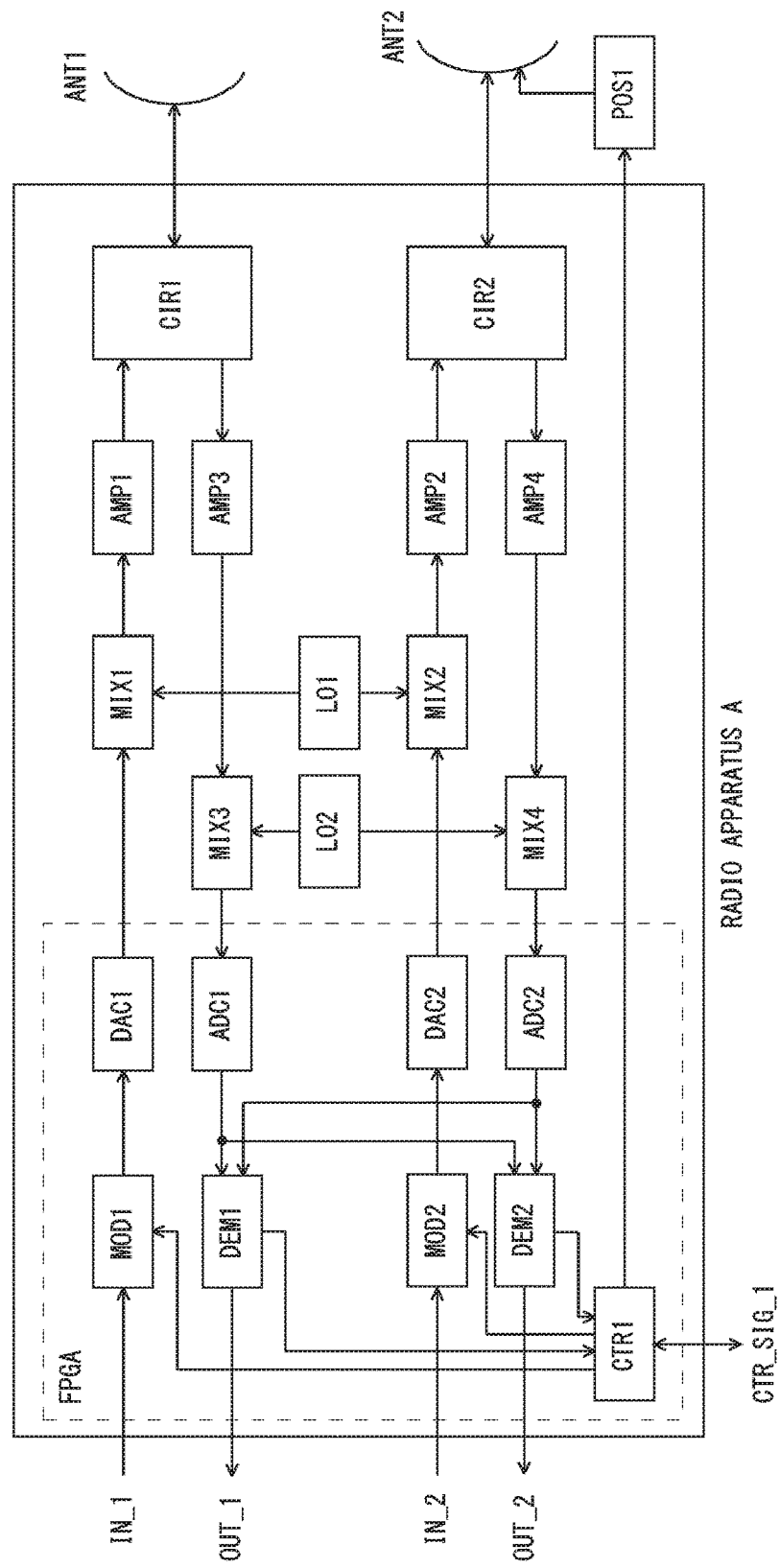
FIG. 7 is a block diagram for explaining a radio apparatus according to a second embodiment.
Figure 8:
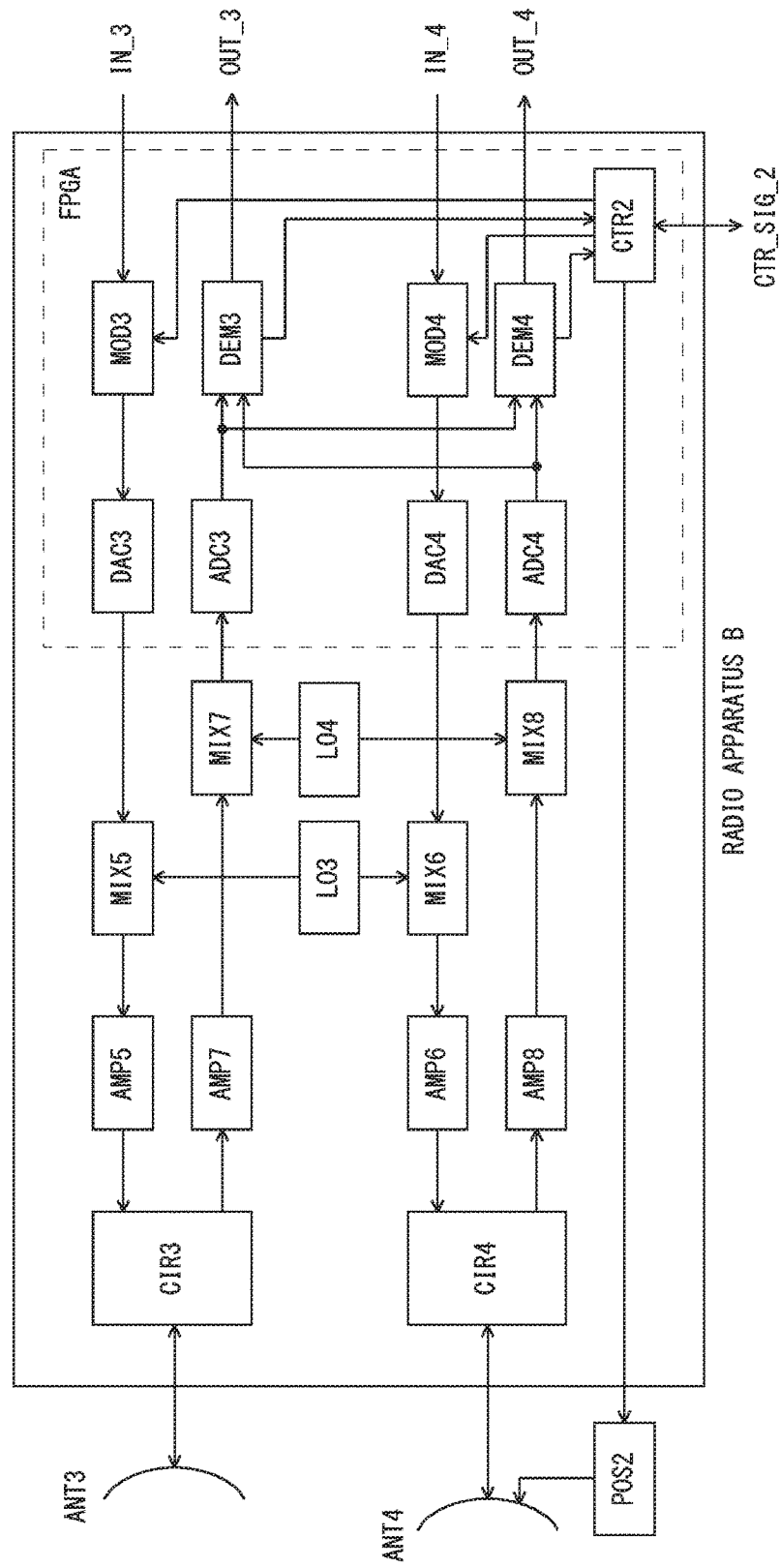
FIG. 8 is a block diagram for explaining a radio apparatus according to a second embodiment.

Next, a second embodiment of the present invention will be described. FIGS. 7 and 8 are block diagrams for explaining a radio apparatus according to a second embodiment. In this embodiment, a more detailed configuration of the radio apparatus explained in the first embodiment will be described.

As shown in FIG. 7, a radio apparatus A includes antennas ANT1 and ANT2, circulators CIR1 and CIR2, amplifiers AMP1 to AMP4, oscillators LO1 and L02, mixers MIX1 to MIX4, AD converters ADC1 and ADC2, DA converters DAC1 and DAC2, modulators MOD1 and MOD2, demodulators DEM1 and DEM2, a control unit CTR1 and a position adjustment unit POS1. For example, the AD converters ADC1 and ADC2, the DA converters DAC1 and DAC2, the modulators MOD1 and MOD2, the demodulators DEM1 and DEM2 and the control unit CTR1 are formed using a FPGA (Field-Programmable Gate Array).

First, when the radio apparatus A transmits input data IN_1, the modulator MOD1 receives the input data IN_1 (digital data), modulates the input data IN_1, and outputs the modulated data to the DA converter DAC1. The DA converter DAC1 converts the input data string into an analog data that can be wirelessly transmitted and outputs the analog data to the mixer MIX1. The oscillator LO1 outputs a signal having a frequency at which radio transmission is performed to the mixers MIX1 and MIX2. The mixer MIX1 converts the signal output from the DA converter DAC1 into the frequency at which radio transmission is performed by combining the signal output from the DA converter DAC1 and the signal output from the oscillator LO1, and outputs the converted signal to the amplifier AMP1 as a transmission signal. The amplifier AMP1 amplifies the transmission signal supplied from the mixer MIX1 and outputs the amplified signal to the circulator CIR1. The circulator CIR1 outputs the transmission signal supplied from the amplifier AMP1 to the antenna ANT1. The antenna ANT1 wirelessly transmits the transmission signal to other stations.

Note that operations of the modulator MOD2, the DA converter DAC2, the mixer MIX2, the amplifier AMP2, the circulator CIR2 and the antenna ANT2 which are performed when the radio apparatus A transmits input data IN_2 are similar to those described above.

When the antenna ANT1 of the radio apparatus A receives radio waves from other stations, the antenna ANT1 outputs a reception signal (analog signal) to the circulator CIR1. The circulator CIR1 outputs the reception signal supplied from the antenna ANT1 to the amplifier AMP3. The amplifier AMP3 amplifies the reception signal supplied from the circulator CIR1 and outputs the amplified signal to the mixer MIX3. The oscillator LO2 outputs a low-frequency signal to the mixers MIX3 and MIX4. The mixer MIX3 converts the reception signal supplied from the amplifier AMP3 (high-frequency analog signal) into a low-frequency analog signal by combining the signal output from the oscillator LO2 and the reception signal supplied from the amplifier AMP3, and outputs the low-frequency analog signal to the AD converter ADC1. The AD converter ADC1 converts the analog signal supplied from the mixer MIX3 into a digital signal and outputs the digital signal to the demodulators DEM1 and DEM2.

Further, when the antenna ANT2 of the radio apparatus A receives radio waves from other stations, the antenna ANT2 outputs a reception signal (analog signal) to the circulator CIR2. Here, it is assumed that the phase of the radio wave received through the antenna ANT2 is shifted from that of the radio wave received through the antenna ANT1 by 90° ($\pi/2$ radian) (in the case where the position of the antenna ANT2 has already been adjusted.). The circulator CIR2 outputs the reception signal supplied from the antenna ANT2 to the amplifier AMP4. The amplifier AMP4 amplifies the reception signal supplied from the circulator CIR2 and outputs the amplified signal to the mixer MIX4. The mixer MIX4 converts a reception signal supplied from the amp AMP4 (high-frequency analog signal) into a low-frequency analog signal by combining the signal output from the oscillator LO2 and the reception signal supplied from the amp AMP4, and outputs the converted signal to the AD converter ADC2. The AD converter ADC2 converts an analog signal supplied from the mixer MIX4 into a digital signal and outputs the converted signal to the demodulators DEM1 and DEM2.

The demodulator DEM1 performs a computation in which a phase of the digital signal supplied from the AD converter ADC2 is converted by $-\pi/2$ ($-90°$). Then the demodulator DEM1 combines (adds) this converted digital signal and the digital signal supplied from the AD converter ADC1 and outputs the combined signal as an output OUT_1. Note that the phase of the digital signal supplied from the AD converter ADC1 is zero and the phase ($\pi/2$) of the digital signal supplied from the AD converter ADC2 becomes zero after being subjected to the $-\pi/2$ conversion. Therefore, when these signals are combined with each other (added to each other), they strengthen each other and hence the signal level of the output OUT_1 is increased. Therefore, the reception signal is output from the output OUT_1.

The demodulator DEM2 performs a computation in which a phase of the digital signal supplied from the AD converter ADC1 is converted by $-\pi/2$ ($-90°$). Then the demodulator DEM2 combines (adds) this converted digital signal and the digital signal supplied from the AD converter ADC2 and outputs the combined signal as an output OUT_2. Note that the phase of the digital signal supplied from the AD converter ADC2 is $\pi/2$ and the phase (0) of the digital signal supplied from the AD converter ADC1 becomes $-\pi/2$ after being subjected to the $-\pi/2$ conversion. Therefore, when these signals are combined with each other (added to each other), they cancel each other and hence the signal level of the output OUT_2 is decreased. Therefore, the reception signal is not output from the output OUT_2.

The position adjustment unit POS1 adjusts the position of the antenna ANT2 according to a control signal supplied from the control unit CTR1. The control unit CTR1 controls the radio apparatus A according to a control signal CTR_SIG_1 supplied form a terminal (not shown). Specifically, the control unit CTR1 outputs the control signal to the position adjustment unit POS1 in order to adjust the position of the antenna ANT2. Further, the control unit CTR1 controls the execution and stopping of the operations of the modulators MOD1 and MOD2. Furthermore, the control unit CTR1 obtains phase information from the demodulators DEM1 and DEM2.

As shown in FIG. 8, a radio apparatus B includes antennas ANT3 and ANT4, circulators CIR3 and CIR4, amplifiers AMP5 to AMP8, oscillators LO3 and L04, mixers MIX5 to MIX8, AD converters ADC3 and ADC4, DA converters DAC3 and DAC4, modulators MOD3 and MOD4, demodulators DEM3 and DEM4, a control unit CTR2 and a position adjustment unit POS2. For example, the AD converters ADC3 and ADC4, the DA converters DAC3 and DAC4, the modulators MOD3 and MOD4, the demodulators DEM3 and DEM4 and the control unit CTR2 are formed using the FPGA.

Note that since the configuration and operation of the radio apparatus B shown in FIG. 8 are similar to those of the radio apparatus A shown in FIG. 7, the duplicated explanations are omitted. Note that the antennas ANT3 and ANT4, the circulators CIR3 and CIR4, the amplifiers AMP5 to AMP8, the oscillators LO3 and L04, the mixers MIX5 to MIX8, the AD converters ADC3 and ADC4, the DA converters DAC3 and DAC4, the modulators MOD3 and MOD4, the demodulators DEM3 and DEM4, the control unit CTR2 and the position adjustment unit POS2 of the radio apparatus B shown in FIG. 8 correspond to the antennas ANT1 and ANT2, the circulators CIR1 and CIR2, the amplifiers AMP1 to AMP4, the oscillators LO1 and L02, the mixers MIX1 to MIX4, the AD converters ADC1 and ADC2, the DA converters DAC1 and DAC2, the modulators MOD1 and MOD2, the demodulators DEM1 and DEM2, the control unit CTR1 and the position adjustment unit POS1, respectively, of the radio apparatus A shown in FIG. 7.

Note that the radio apparatus A shown in FIG. 7 and the radio apparatus B shown in FIG. 8 can perform the line-of-sight MIMO communication with each other as described above by using FIGS. 1 and 2.

Figure 9:
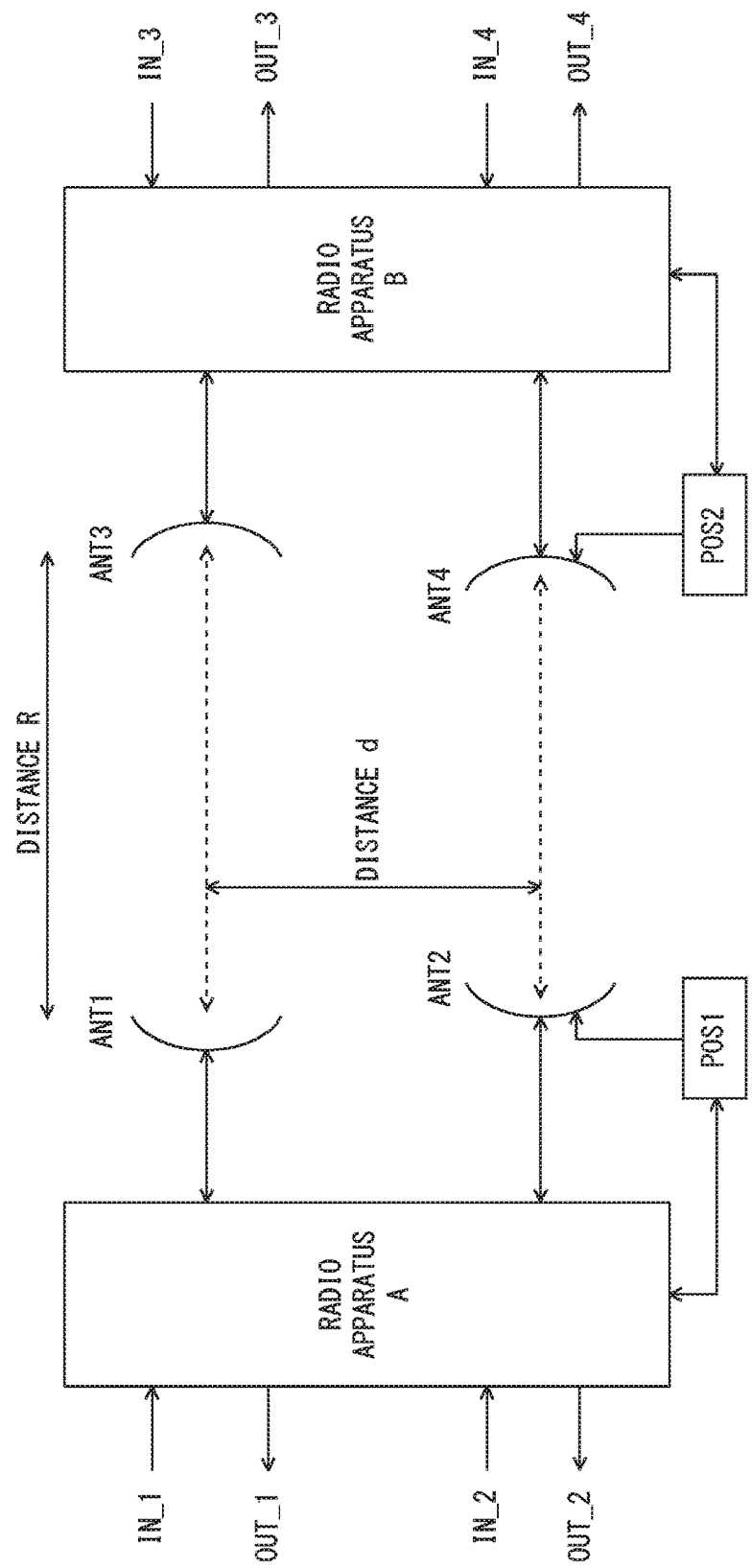
FIG. 9 is a diagram for explaining a radio communication system according to a second embodiment.

Next, a method for adjusting positions of antennas using the position adjustment unit will be described. As an example, the case where the antenna ANT4 of the radio apparatus B is adjusted using the position adjustment unit POS2 will be described hereinbelow. First, the condition for a case where the antennas ANT1 to ANT4 are mounted will be described by using FIG. 9. As shown in FIG. 9, a distance d between the antenna ANT1 and the antenna ANT2 of the radio apparatus A and a distance d between the antenna ANT3 and the antenna ANT4 of the radio apparatus B are set respectively so as to satisfy the following expression. Note that a distance R is a distance between the antenna ANT1 of the radio apparatus A and the antenna ANT3 of the radio apparatus B.

Distance $d=(\lambda \cdot R/2)^{0.5}$ where $\lambda=c/f$

In the expression, $\lambda$ is a wavelength; c is the speed of light; and f is a frequency.

Note that since the distance d between the antennas ANT1 and ANT2 and the distance d between the antennas ANT3 and ANT4 are not very long (in a range from on the order of meters to the order of millimeters), they can be accurately mounted. However, since the radio apparatus A and the radio apparatus B are mounted far apart from each other (on the order of kilometers), it is difficult to accurately mount the antennas ANT1 and ANT2 and the antennas ANT3 and ANT4. In an antenna position adjustment method according to this embodiment described hereinbelow, even when the distance between the antennas ANT1 and ANT2 and the antennas ANT3 and ANT4 cannot be accurately determined (for example, the distance R is on the order of kilometers and an error of the distant R is on the order of meters), the positions of the antennas can be appropriately adjusted.

Figure 10:
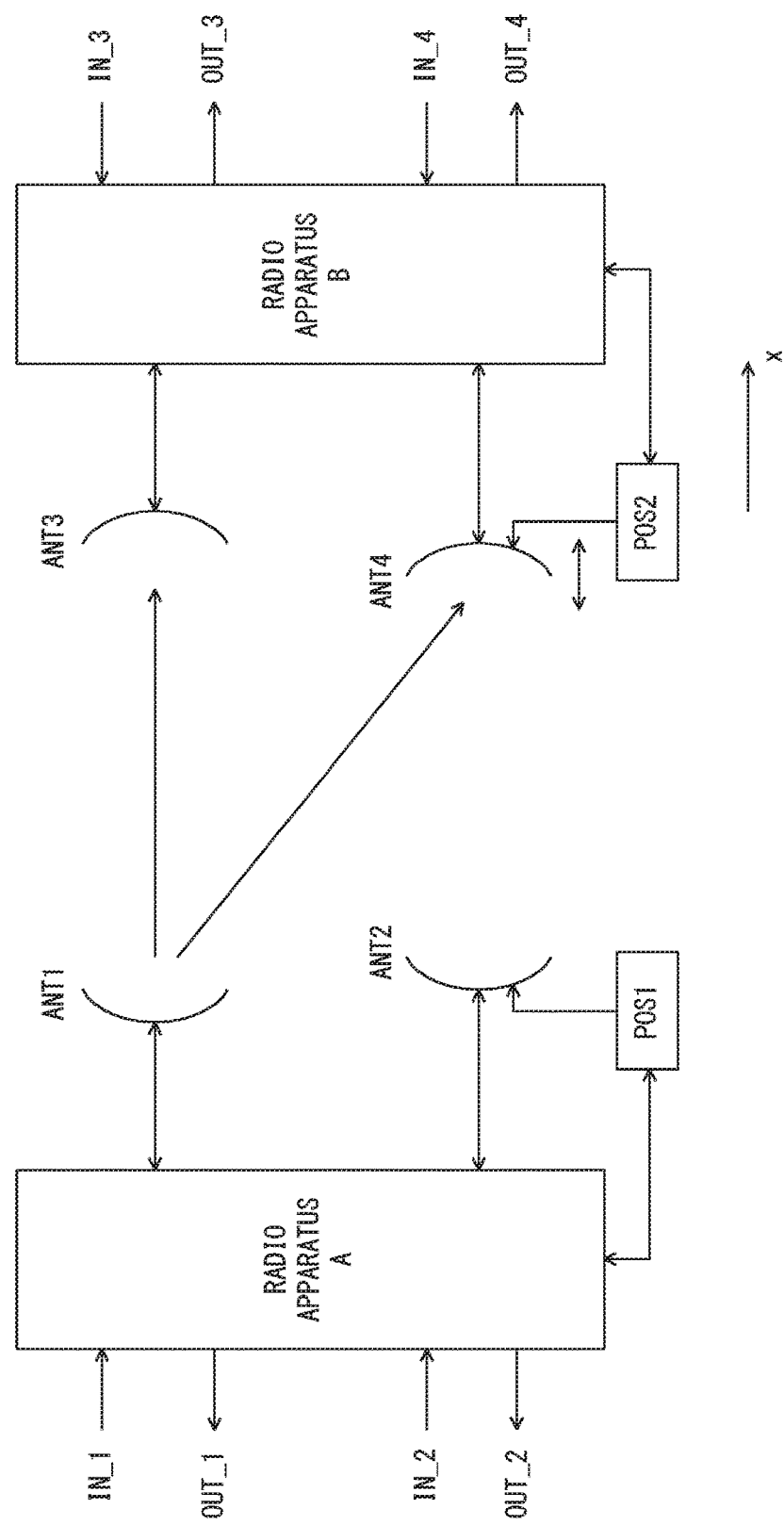
FIG. 10 is a diagram for explaining an operation of a radio communication system according to a second embodiment.
Figure 11:
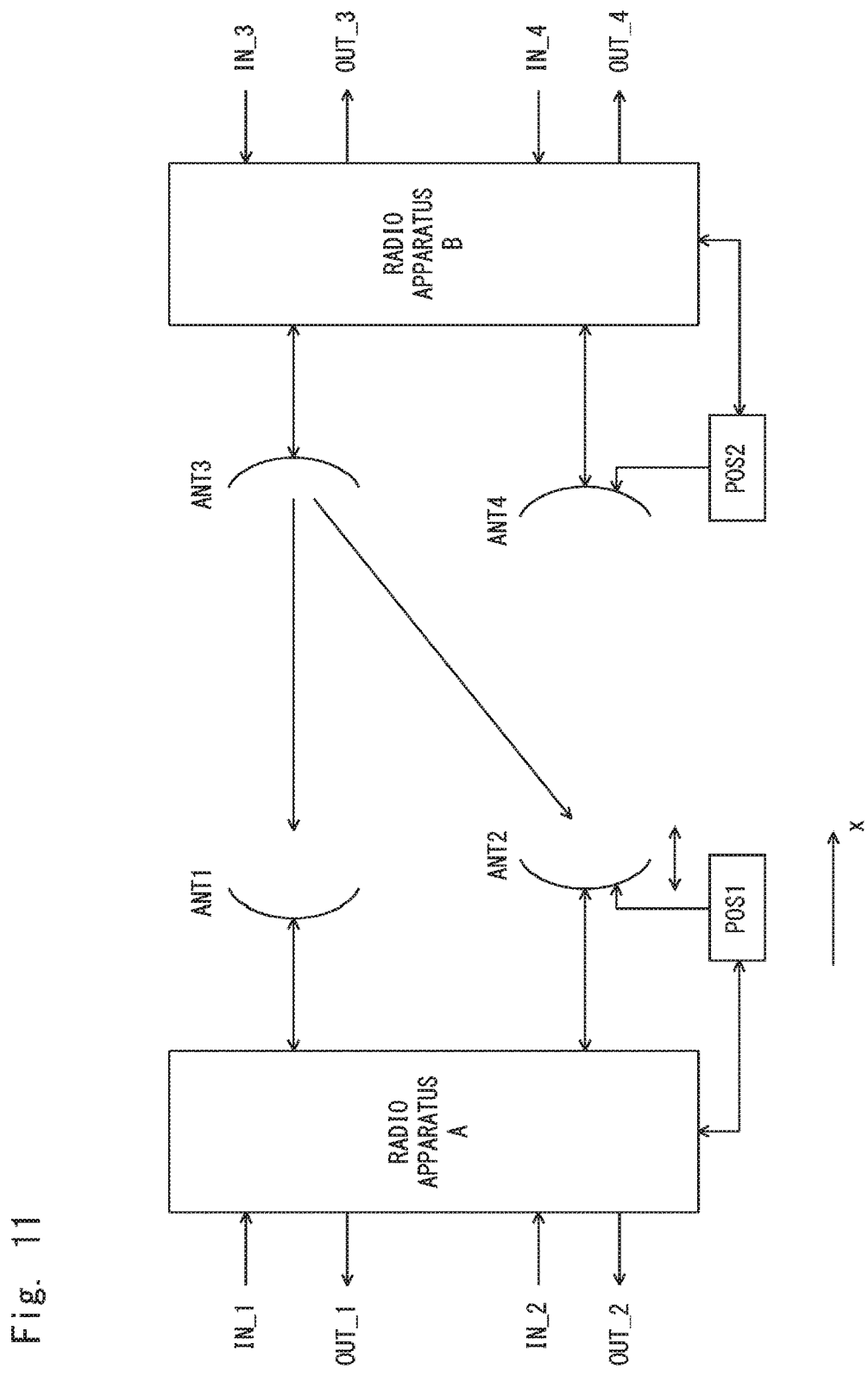
FIG. 11 is a diagram for explaining an operation of a radio communication system according to a second embodiment.
Figure 12:
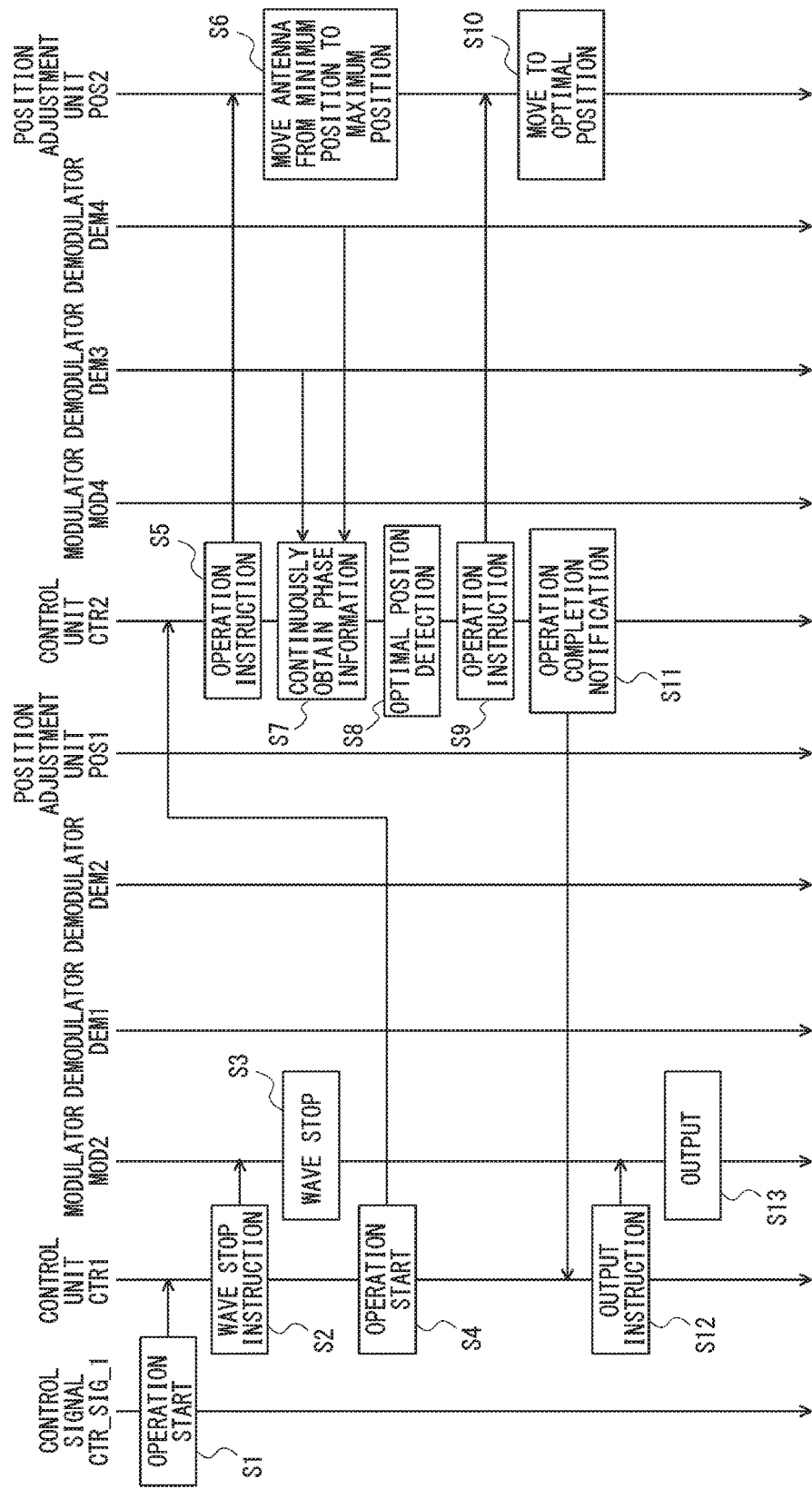
FIG. 12 is a flow chart for explaining an operation of a radio communication system according to a second embodiment.
Figure 13:
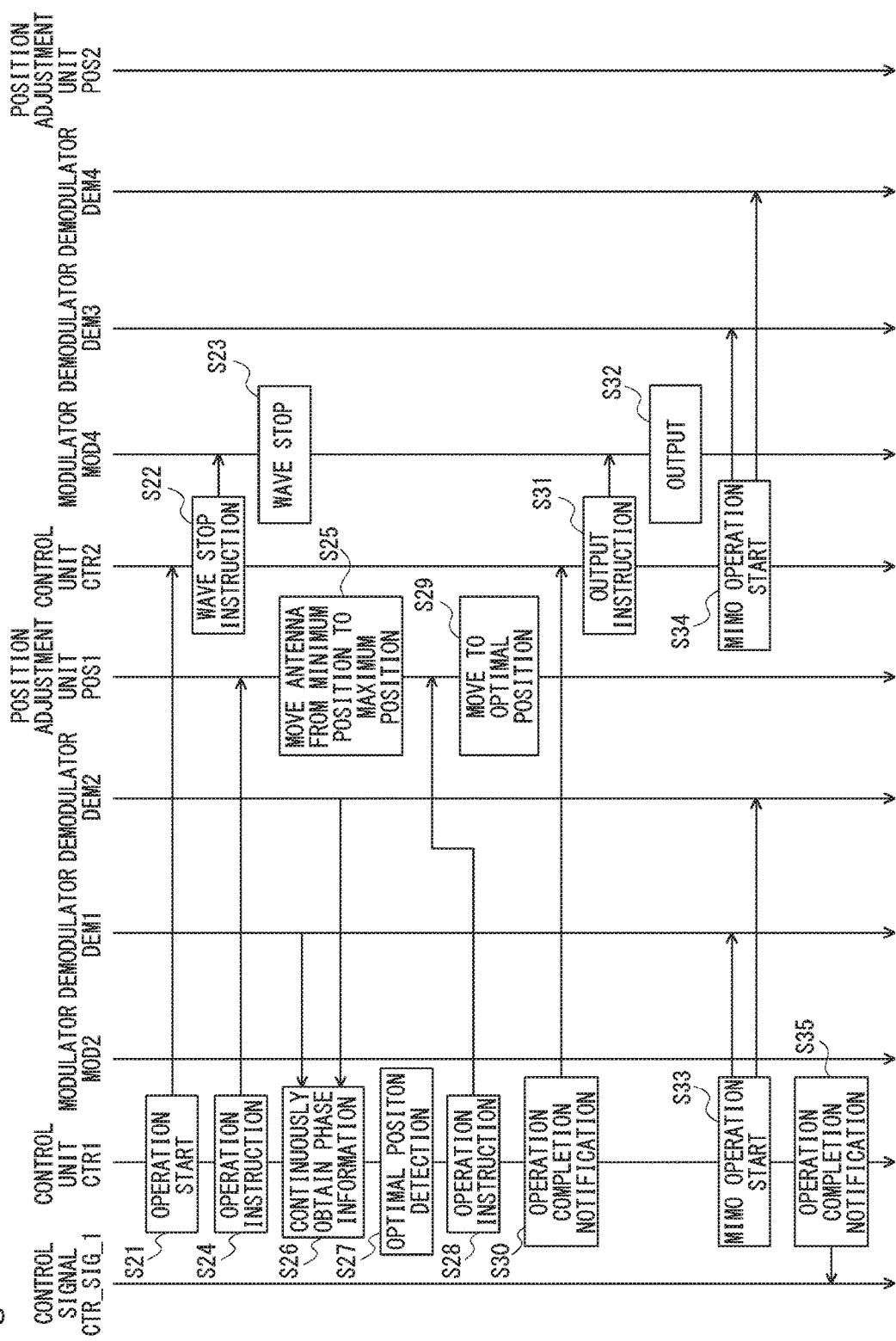
FIG. 13 is a flow chart for explaining an operation of a radio communication system according to a second embodiment.

FIGS. 10 and 11 are diagrams for explaining an operation of a radio communication system according to this embodiment, and FIGS. 12 and 13 are flow charts for explaining the operation of the radio communication system according to this embodiment. As an advance preparation, the antennas ANT1 and ANT2 of the apparatus A are mounted so that a cable length between the antenna ANT1 and the radio apparatus A and a cable length between the antenna ANT2 and the radio apparatus A become equal to each other. Further, the antennas ANT3 and ANT4 of the apparatus B are mounted so that a cable length between the antenna ANT3 and the radio apparatus B and a cable length between the antenna ANT4 and the radio apparatus B become equal to each other. When the cable lengths are not equal to each other, it is necessary to have the demodulator in the radio apparatus perform a computation to correct the cable lengths. Further, when LOS-MIMO communication is started without adjusting the position of each of the antennas, two radio waves having the same frequency could be received. Therefore, there is a high possibility that normal communication cannot be performed. Therefore, it is necessary to appropriately adjust the position of each of the antennas ANT2 and ANT4.

First, the position adjustment of the antenna ANT4 of the radio apparatus B will be described. As shown as a step S1 in FIG. 12, when a control signal CTR_SIG_1 indicating a start of an antenna position adjustment operation is supplied to the control unit CTR1 of the radio apparatus A (see FIG. 7), the control unit CTR1 outputs a wave stop instruction to the modulator MOD2 (step S2). When the modulator MOD2 is supplied with the wave stop instruction from the control unit CTR1, the modulator MOD2 stops outputting signals to the DA converter DAC2 (step S3). In other words, only the modulator MOD1 is in operation and only the antenna ANT1 transmits radio waves (SISO (Single Input Single Output) mode) in this case. Note that it is assumed that all the demodulators DEM1 to DEM4 are in operation.

Next, as shown in FIG. 12, the control unit CTR1 of the radio apparatus A (see FIG. 7) notifies the control unit CTR2 of the radio apparatus B (see FIG. 8) of the start of the antenna position adjustment operation (step S4). Specifically, the control unit CTR1 of the radio apparatus A sends a notification of the start of the antenna position adjustment operation to the control unit CTR2 of the radio apparatus B through the modulator MOD1, the antenna ANT1, the antenna ANT3 (or the antenna ANT4) and the demodulator DEM3 (or the demodulator DEM4). The control unit CTR2 instructs the position adjustment unit POS2 to move the antenna ANT4 (step S5). In other words, the control unit CTR2 controls and thereby makes the position adjustment unit POS2 move the antenna ANT4 from the minimum position (position farthest from the other station) to the maximum position (position closest to the other station) on the slider 27 (see FIGS. 5 and 6) (step S6). In this process, the antenna ANT4 moves along the x-axis in FIG. 10. Further, the control unit CTR2 continuously obtains phase information from the demodulators DEM3 and DEM4 and records the obtained phase information (step S7). In other words, the phase information output from the demodulators DEM3 and DEM4 continuously changes according to the movement of the antenna ANT4 performed by the position adjustment unit POS2. The control unit CTR2 records this continuously-changing phase information.

After the position adjustment unit POS2 has moved the antenna ANT4 to the maximum position, the control unit CTR2 calculates the position where a phase difference between the demodulators DEM3 and DEM4 is $\pi/2$ from the recorded phase information, and defines this position as an optimal position of the antenna ANT4 (step S8). Note that when the movable range of the antenna ANT4 is about one wavelength, there is only one place where the phase difference between the demodulators DEM3 and DEM4 is $\pi/2$. Further, when the movable range of the antenna ANT4 is about n wavelengths (n is an integer equal to or larger than 2), the number of the positions where the phase difference between the demodulators DEM3 and DEM4 is $\pi/2$ is n.

The control unit CTR2 instructs the position adjustment unit POS2 so that the antenna ANT4 is positioned in the optimal position determined in the step S8 (step S9). The position adjustment unit POS2 moves the antenna ANT4 to the optimal position determined in the step S8 (step S10). Further, the control unit CTR2 sends notifies the control unit CTR1 of the radio apparatus A of a completion of the antenna position adjustment operation (step S11). Specifically, the control unit CTR2 sends a notification of the completion of the antenna position adjustment operation to the control unit CTR1 through the modulator MOD3, the antenna ANT3, the antenna ANT1 (or the antenna ANT2) and the demodulator DEM1 (or the demodulator DEM2).

By the operation described above, the operation for adjusting the position of the antenna ANT4 is finished. Then, the control unit CTR1 provides an output instruction to the modulator MOD2 (step S12). When the modulator MOD2 is supplied with the output instructions from the control unit CTR1, the modulator MOD2 starts outputting signals to the DA converter DAC2 (step S13). Thus, the LOS-MIMO communication from the radio apparatus A to the radio apparatus B can be performed.

Next, the position adjustment of the antenna ANT2 of the radio apparatus A will be described. As shown as a step S21 of FIG. 13, the control unit CTR1 of the radio apparatus A (see FIG. 7) notifies the control unit CTR2 of the radio apparatus B (see FIG. 8) of the start of the antenna position adjustment operation. When the control unit CTR2 of the radio apparatus B is notified of the start of the antenna position adjustment operation from the control unit CTR1, the control unit CTR2 outputs a wave stop instruction to the modulator MOD4 (see FIG. 8) (step S22). When the modulator MOD4 is supplied with the wave stop instruction from the control unit CTR2, the modulator MOD4 stops outputting signals to the DA converter DAC4 (step S23). In other words, only the modulator MOD3 is in operation and only the antenna ANT3 transmits radio waves (SISO mode) in this case. Note that it is assumed that all the demodulators DEM1 to DEM4 are in operation.

Next, the control unit CTR1 of the radio apparatus A instructs the position adjustment unit POS1 to move the antenna ANT2 (step S24). In other words, the control unit CTR1 controls and thereby makes the position adjustment unit POS1 move the antenna ANT2 from the minimum position (position farthest from the other station) to the maximum position (position closest to the other station) on the slider 27 (see FIGS. 5 and 6) (step S25). In this process, the antenna ANT2 moves along the x-axis in FIG. 11. Further, the control unit CTR1 continuously obtains phase information from the demodulators DEM1 and DEM2 and records the obtained phase information (step S26). In other words, the phase information output from the demodulators DEM1 and DEM2 continuously changes according to the movement of the antenna ANT2 performed by the position adjustment unit POS1. The control unit CTR1 records this continuously-changing phase information.

After the position adjustment unit POS1 has moved the antenna ANT2 to the maximum position, the control unit CTR1 calculates the position where a phase difference between the demodulators DEM1 and DEM2 is $\pi/2$ from the recorded phase information, and defines this position as an optimal position of the antenna ANT2 (step S27). Note that when the movable range of the antenna ANT2 is about one wavelength, there is only one place where the phase difference between the demodulators DEM1 and DEM2 is $\pi/2$. Further, when the movable range of the antenna ANT2 is about n wavelengths (n is an integer equal to or larger than 2), the number of the positions where the phase difference between the demodulators DEM1 and DEM2 is $\pi/2$ is n.

The control unit CTR1 instructs the position adjustment unit POS1 so that the antenna ANT2 is positioned in the optimal position determined in the step S27 (step S28). The position adjustment unit POS1 moves the antenna ANT2 to the optimal position determined in the step S27 (step S29). Further, the control unit CTR1 sends notifies the control unit CTR2 of the radio apparatus B of a completion of the antenna position adjustment operation (step S30).

By the operation described above, the operation for adjusting the position of the antenna ANT2 is finished. Then, the control unit CTR2 of the radio apparatus B provides an output instruction to the modulator MOD4 (step S31). When the modulator MOD4 is supplied with the output instructions from the control unit CTR2, the modulator MOD4 starts outputting signals to the DA converter DAC4 (step S32). Thus, the LOS-MIMO communication from the radio apparatus B to the radio apparatus A can be performed.

Then, the control unit CTR1 of the radio apparatus A notifies the demodulators DEM1 and DEM2 of a start of the MIMO operation (step S33). Further, the control unit CTR2 of the radio apparatus B notifies the demodulators DEM3 and DEM4 of the start of the MIMO operation (step S34). From then on, the radio apparatuses A and B start LOS-MIMO communication with each other. Further, the control unit CTR1 of the radio apparatus A notifies a user terminal of an end of the antenna position adjustment operation using a control signal CTR_SIG_1 (step S35).

Figure 14:
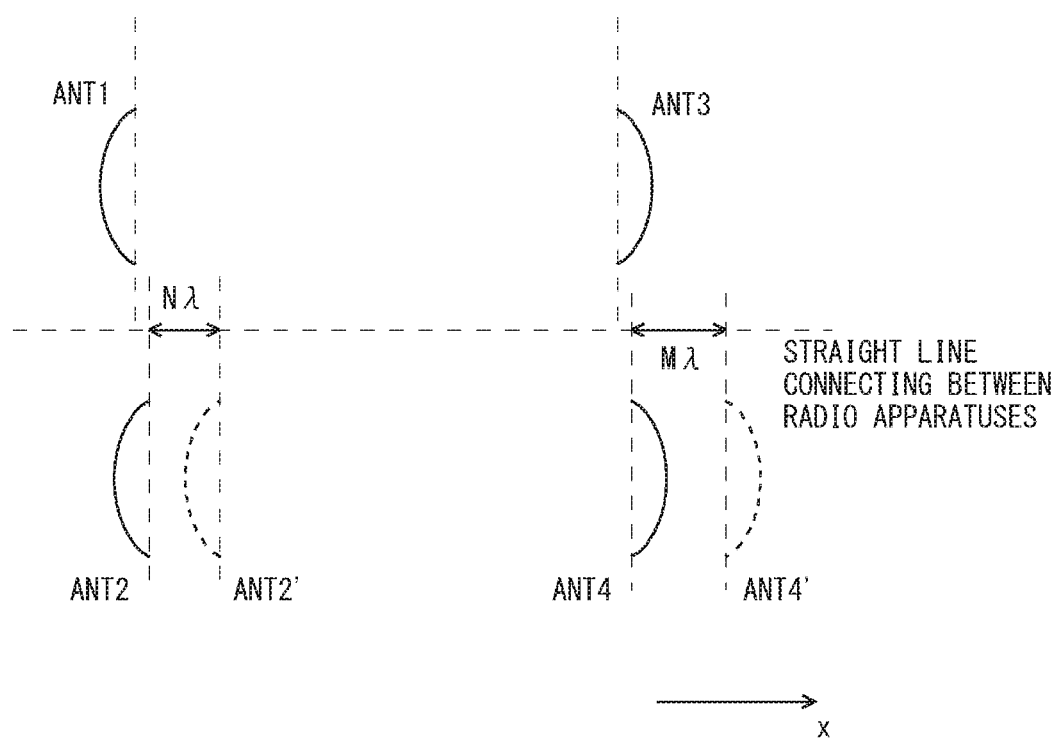
FIG. 14 is a diagram for explaining an antenna position after adjustment.

FIG. 14 is a diagram for explaining the antenna position after adjustment. As shown in FIG. 14, the antennas ANT1 and ANT2 of the radio apparatus A are arranged so that when radio waves transmitted through the antenna ANT3 are received through each of the antennas ANT1 and ANT2, phases are shifted from each other by $\pi/2$. Further, the antennas ANT3 and ANT4 of the radio apparatus B are arranged so that when radio waves transmitted through the antenna ANT1 are received through each of the antennas ANT3 and ANT4, phases are shifted from each other by $\pi/2$.

In this process, the position of the antenna ANT2 may be a position ANT2' shifted by $N\lambda$. Likewise, the position of the antenna ANT4 may be a position ANT4' shifted by $M\lambda$. Here, N and M are integers and $\lambda$ is a wavelength of a radio wave. Note that no adjustment is made in the case where radio waves are transmitted from the antenna ANT2 of the radio apparatus A to the antennas ANT3 and ANT4 of the radio apparatus B, and in the case where radio waves are transmitted from the antenna ANT4 of the radio apparatus B to the antennas ANT1 and ANT2 of the radio apparatus A. However, in the case where each of the antennas ANT1 to ANT4 satisfies positional relations shown in FIG. 14, phases are shifted from each other by $\pi/2$ when radio waves transmitted from the antenna ANT4 are received through each of the antennas ANT1 and ANT2, or phases are shifted from each other by $\pi/2$ when radio waves transmitted from the antenna ANT2 are received through each of the antennas ANT3 and ANT4.

For example, the invention according to the above-described embodiment can be applied to TDD (Time Division Duplex) and FDD (Frequency Division Duplex). In the case of the TDD, since the radio apparatuses A and B use the same frequency, a distance d between the antennas ANT1 and ANT2 of the radio apparatus A is equal to a distance d between the antennas ANT3 and ANT4 of the radio apparatus B as shown in FIG. 9.

Figure 15:
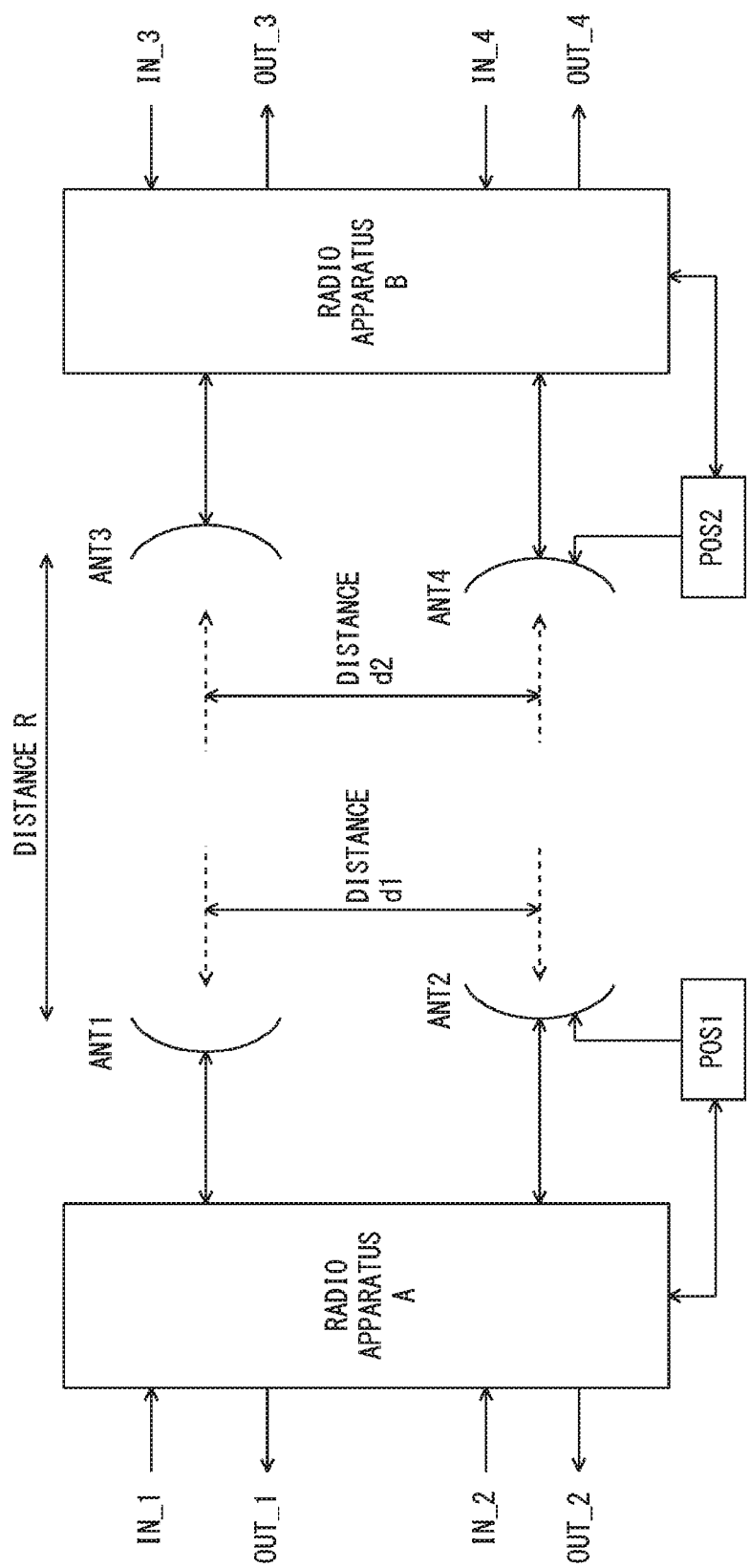
FIG. 15 is a diagram for explaining in case of applying a radio communication system to FDD according to a second embodiment.

In contrast, in the case of the FDD, since the radio apparatuses A and B use different frequencies, a distance d1 between the antennas ANT1 and ANT2 of the radio apparatus A differs from a distance d2 between the antennas ANT3 and ANT4 of the radio apparatus B as shown in FIG. 15. In this case, in order to appropriately adjust a path difference between antennas in a receiving operation, the distances d1 and d2 between respective antennas are determined by using wavelengths at reception frequencies.

The position adjustment unit POS1 provided in the radio apparatus A is configured so as to be able to adjust distances among a plurality of antennas ANT1 and ANT2 provided in the radio apparatus A. That is, the position adjustment unit POS1 can adjust a distance between the antennas ANT1 and ANT2 of the radio apparatus A so that the distance becomes the distance d1. Similarly, the position adjustment unit POS2 provided in the radio apparatus B is configured so as to be able to adjust distances among a plurality of antennas ANT3 and ANT4 provided in the radio apparatus B. That is, the position adjustment unit POS2 can adjust a distance between the antennas ANT3 and ANT4 of the radio apparatus B so that the distance becomes the distance d2.

Further, in the case of the FDD, the value $N\lambda$ shown in FIG. 14 becomes $N\lambda3$ ($\lambda3$ is a wavelength at a frequency used in the antenna ANT3), and the value $M\lambda$ becomes $M\lambda1$ ($\lambda1$ is a wavelength at a frequency used in the antenna ANT3). However, in the case where the distance between the apparatuses A and B is large, even when the position on the transmitting side is deviated to some extent, its effect is negligible. Therefore, the present application can be applied even in the case of the FDD.

Note that the above-described antenna adjustment method has been explained by using cases in which an amount of a shift between phases of the antenna ANT1 and ANT2 of the radio apparatus A and an amount of a shift between phases of the antenna ANT3 and ANT4 of the radio apparatus B are detected by using the demodulators DEM1 to DEM4. However, in this embodiment, an amount of a shift between phases may be detected by using other indices. For example, the demodulators DEM1 to DEM4 may be made to perform a MIMO operation upon start of their operations, and an amount of a shift between phases may be detected by detecting a position where an optimal CNR (Carrier to Noise Ratio) in a demodulating operation is obtained.

As described above, when the movable range on the slider 27 (see FIGS. 5 and 6) is about one wavelength, there is only one place where the antenna is in an optimal position. Further, when the movable range is about n wavelengths (n is an integer equal to or larger than 2), n appropriate positions (positions where the phase is shifted by $\pi/2$) are detected. Note that the CNRs of the n detected appropriate positions (positions where the phase is shifted by $\pi/2$) could deteriorate depending on the position. Even when the CNR deteriorates, it is possible to correct the CNR by using an equalizer included in the demodulator. However, the corrected CNR is still poorer than that in the optimal position. Therefore, by using the CNR in a demodulating operation, it is possible to define a position where the CNR is optimal, among the n detected appropriate positions (positions where the phase is shifted by $\pi/2$), as an optimal antenna position.

Further, in the above descriptions, cases where each of the radio apparatuses A and B includes two antennas have been described. However, in this embodiment, each of the radio apparatuses A and B may include three or more antennas. Further, the number of antennas in the radio apparatuses may be different from each other. That is, for example, the radio apparatus A may include three antennas and the radio apparatus B may include four antennas. Further, the number of position adjustment units provided in each of the radio apparatuses A and B is preferably "equal to or greater than the number of the antennas −1". That is, when the number of antenna of the radio apparatus A is three, the number of position adjustment units can be two or three.

Although the present invention is explained above with reference to embodiments, the present invention is not limited to the above-described embodiments. Various modifications that can be understood by those skilled in the art can be made to the configuration and details of the present invention within the scope of the invention.

REFERENCE SIGNS LIST

10 RADIO APPARATUS
11 MAIN UNIT
12 POSITION ADJUSTMENT UNIT
15, 16 ANTENNA
21 POLE
22_1, 22_2 CLAMP
23 HOLDER
24 RECESS
25, 28 MOTOR
26, 30 SCREW
27 SLIDER
29 FIXING MEMBER
32_1, 32_2 CLAMP
33 FIXING MEMBER

The invention claimed is:

1. A radio apparatus used in a line-of-sight MIMO communication system, comprising:
first and second antennas, and
a position adjustment unit configured to adjust a relative position between at least one of the first and second antennas and an antenna included in another radio apparatus, wherein
when the position adjustment unit adjusts a position of the second antenna so that a phase of a radio wave transmitted from the another radio apparatus and received through the second antenna is shifted from a phase of the radio wave transmitted from the another radio apparatus and received through the first antenna by $\pi/2$, the position adjustment unit adjusts the position of the second antenna based on at least one of a first reception signal generated by combining a signal which is received through the first antenna and whose phase is shifted by $-\pi/2$ and a signal which is received through the second antenna with each other, and a second reception signal generated by combining a signal which is received through the second antenna and whose phase is shifted by $-\pi/2$ and a signal which is received through the first antenna with each other.

2. The radio apparatus according to claim 1, wherein the position adjustment unit adjusts the position of the second antenna so that a signal level of the first reception signal is maximized and the signal level of the second reception signal is minimized, or the signal level of the first reception signal is minimized and the signal level of the second reception signal is maximized.

3. The radio apparatus according to claim 1, wherein the position adjustment unit displaces the antenna along an axis roughly parallel to a straight line connecting the radio apparatus and the another radio apparatus.

4. The radio apparatus according to claim 1, wherein the position adjustment unit displaces the antenna along an axis roughly perpendicular to a straight line connecting the radio apparatus and the another radio apparatus.

5. The radio apparatus according to claim 1, wherein the position adjustment unit adjusts a direction of the antenna with respect to the another radio apparatus so that a reception strength of a radio wave transmitted from the another radio apparatus is increased.

6. A radio communication system comprising first and second radio apparatuses, and configured to perform line-of-sight MIMO communication wherein
the first radio apparatus comprises:
a plurality of antennas; and
a first position adjustment unit configured to adjust a relative position between at least one of the plurality of antennas and an antenna included in the second radio apparatus, and
the second radio apparatus comprises:
a plurality of antennas; and
a second position adjustment unit configured to adjust a relative position between at least one of the plurality of antennas and an antenna included in the first radio apparatus.

7. The radio communication system according to claim 6, wherein
the first radio apparatus comprises first and second antennas,
the second radio apparatus comprises third and fourth antennas, and the first position adjustment unit adjusts a position of the second antenna so that a phase of a radio wave transmitted from the third antenna and received through the second antenna is shifted from a phase of the radio wave transmitted from the third antenna and received through the first antenna by $\pi/2$.

8. The radio communication system according to claim 7, wherein the second position adjustment unit adjusts the a position of the fourth antenna so that a phase of the radio wave transmitted from the first antenna and received through the fourth antenna is shifted from a phase of the radio wave transmitted from the first antenna and received through the third antenna by $\pi/2$.

9. The radio communication system according to claim 6, wherein the first position adjustment unit is further configured to be able to adjust a distance among the plurality of antennas included in the first radio apparatus.

10. The radio communication system according to claim 6, wherein the second position adjustment unit is further configured to be able to adjust a distance among the plurality of antennas included in the second radio apparatus.

11. The radio communication system according to claim 9, wherein the first and second radio apparatuses are configured to be able to perform communication using the frequency division duplex (FDD).

12. An antenna position adjustment method for a radio apparatus used in a line-of-sight MIMO communication system wherein
the radio apparatus comprises first and second antennas configured to receive a radio wave transmitted from another radio apparatus, and
when a position of the second antenna is adjusted so that a phase of the radio wave transmitted from the another radio apparatus and received through the second antenna is shifted from a phase of the radio wave transmitted from the another radio apparatus and received through the first antenna by $\pi/2$, the position of the second antenna is adjusted based on at least one of a first reception signal generated by combining a signal which is received through the first antenna and whose phase is shifted by $-\pi/2$ and a signal which is received through the second antenna with each other, and a second reception signal generated by combining a signal which is received through the second antenna and whose phase is shifted by $-\pi/2$ and a signal which is received through the first antenna with each other.

* * * * *

UNITED STATES PATENT AND TRADEMARK OFFICE
CERTIFICATE OF CORRECTION

PATENT NO. : 10,432,271 B2
APPLICATION NO. : 16/068017
DATED : October 1, 2019
INVENTOR(S) : Shigeo Yamada Page 1 of 1

It is certified that error appears in the above-identified patent and that said Letters Patent is hereby corrected as shown below:

In the Specification

Column 3, Description of Embodiments, Line 56; Delete "(phase $\theta=0°-90°=)-90°$" and insert --(phase $\theta=0°-90°=-90°$)-- therefor Column 4, Description of Embodiments, Line 17; Delete "(phase $\theta=0°-90°=)-90°$" and insert --(phase $\theta=0°-90°=-90°$)-- therefor Column 5, Description of Embodiments, Line 17; Delete "$\eta/2$" and insert --$\pi/2$-- therefor Column 8, Description of Embodiments, Line 50; Delete "L02," and insert --LO2,-- therefor Column 10, Description of Embodiments, Line 31; Delete "L04," and insert --LO4,-- therefor Column 10, Description of Embodiments, Line 45; Delete "L04," and insert --LO4,-- therefor Column 10, Description of Embodiments, Line 52; Delete "L02," and insert --LO2,-- therefor Column 14, Description of Embodiments, Line 16; Delete "Mk." and insert --M$\lambda$.-- therefor Signed and Sealed this
Twenty-eighth Day of January, 2020

Andrei Iancu
*Director of the United States Patent and Trademark Office*